US010326486B2

(12) United States Patent
Koshy (10) Patent No.: US 10,326,486 B2
(45) Date of Patent: Jun. 18, 2019

(54) METHODS AND APPARATUS FOR DYNAMIC CONTROL OF SPECIFIC ABSORPTION RATE (71) Applicant: Dell Products, LP, Round Rock, TX (US)

(72) Inventor: Kamal J. Koshy, Austin, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

(21) Appl. No.: 15/668,041

(22) Filed: Aug. 3, 2017

(65) Prior Publication Data

US 2019/0044560 A1 Feb. 7, 2019

(51) Int. Cl.
*H04B 1/3827* (2015.01)
*H04B 7/06* (2006.01)
*H04W 52/14* (2009.01)

(52) U.S. Cl.
CPC ......... *H04B 1/3838* (2013.01); *H04B 7/0686* (2013.01); *H04B 7/0602* (2013.01); *H04W 52/146* (2013.01)

(58) Field of Classification Search
CPC .................................................. H04B 1/3838
See application file for complete search history.

(56) References Cited

U.S. PATENT DOCUMENTS

| | | | | |
|---|---|---|---|---|
| 7,031,657 B2* | 4/2006 | Tehrani | ................ | H04B 1/3838 455/11.1 |
| 7,567,530 B2* | 7/2009 | Lee | ...................... | H04B 1/3838 370/329 |
| 2006/0030281 A1* | 2/2006 | Brunel | ................. | H04B 1/3838 455/127.1 |
| 2006/0120330 A1* | 6/2006 | Lee | ...................... | H04B 1/3838 370/331 |
| 2011/0034135 A1 | 2/2011 | Ali | | |
| 2011/0279118 A1* | 11/2011 | Griswold | ............. | G01R 33/288 324/309 |
| 2012/0274538 A1* | 11/2012 | Tsou | ...................... | H01Q 1/243 343/876 |
| 2013/0090072 A1* | 4/2013 | Lim | ....................... | H01Q 1/243 455/77 |
| 2014/0128032 A1* | 5/2014 | Muthukumar | ........... | H01Q 3/00 455/411 |
| 2015/0173094 A1* | 6/2015 | Vangala | ................ | H04W 72/10 370/329 |
| 2015/0382307 A1* | 12/2015 | Harper | ................. | H04B 1/3838 455/103 |
| 2016/0174168 A1 | 6/2016 | Lu | | |
| 2016/0374031 A1* | 12/2016 | Lee | ...................... | H04W 52/346 |
| 2017/0250718 A1* | 8/2017 | Choi | .................... | H04B 1/3838 |

* cited by examiner

*Primary Examiner* — Duc M Nguyen
(74) *Attorney, Agent, or Firm* — Prol Intellectual Property Law, PLLC; H. Kenneth Prol (57) ABSTRACT A wireless information handling system includes a specific absorption rate sensor, a wireless communications module, and a wireless controller in communication with the specific absorption rate sensor and the wireless communications module. The wireless communications module is to transmit a signal using a frequency domain including a set of frequencies. The specific absorption rate sensor is to measure the specific absorption rate when transmitting the signal. The wireless communication module is to transmit a subsequent signal using an adjusted frequency domain including a subset of the set of frequencies in response to measuring the specific absorption rate.

20 Claims, 4 Drawing Sheets

METHODS AND APPARATUS FOR DYNAMIC CONTROL OF SPECIFIC ABSORPTION RATE

FIELD OF THE DISCLOSURE

This disclosure, in general, relates to methods and apparatuses that control transmission parameters in response to specific absorption rate.

BACKGROUND

As wireless devices and associated wireless networks become ubiquitous in the lives of professionals and consumers, increasing concern has been expressed regarding exposure to radiofrequency radiation. For example, concerns have been expressed about cancer and cellular telephone usage. As use of other wireless devices, such as wireless headsets, wireless pad devices, laptops, game console controllers, wireless mice and keyboards, among other devices, concern has been extended to the influence of various wireless frequencies on the body and its functions.

Accordingly, regulators have sought to limit exposure, measured as a specific absorption rate (SAR), when using wireless devices. Various national and regional standards bodies have implemented specific absorption rate (SAR) thresholds or ranges Manufacturers are tasked with making devices that do not violate the regulated SAR ranges.

To reduce SAR, manufacturers sought to reduce transmission power or to cycle transmissions in the time-domain. However, reducing transmission power can lead to airtime inefficiencies and performance degradation. Similarly, time-domain duty cycling can reduce performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A wireless information handling system, such as a laptop computer including wireless capabilities, a smart phone, a tablet device, wireless headsets and headphones, game controllers, wireless keyboards or mice, or other wireless devices, establishes communication with other devices on the wireless network in accordance with one or more wireless protocols. The wireless communication protocol may specify a set of frequencies at which signals are transmitted. In another example, the information handling system when communicating with a server or other wireless device establishing the wireless network can be provided a set of frequencies over which to transmit. When transmitting at the set of frequencies, the wireless information handling system can measure the specific absorption rate (SAR) and determine whether the SAR is within a permissible range. When the SAR is not within a permissible range, the wireless information handling system can adjust the frequency domain to provide a subset of the set of frequencies over which the wireless information handling system is to transmit subsequent signals. The wireless information handling system optionally may also adjust a power of the transmission or adapt time-domain duty cycling. Following adjustments, the wireless information handling system can transmit subsequent signals using the subset of frequencies and other transmission parameters and measure the resulting SAR. When the SAR falls below a threshold, the system can further adjust parameters and the subset of frequencies, for example increasing the number of frequencies within the subset or re-adopting the set of frequencies provided by the communication standard protocol or wireless system. As such, the SAR associated with the wireless information handling system can be adjusted dynamically, particularly in the frequency domain to maintain the SAR within a desired range.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Figure 1:
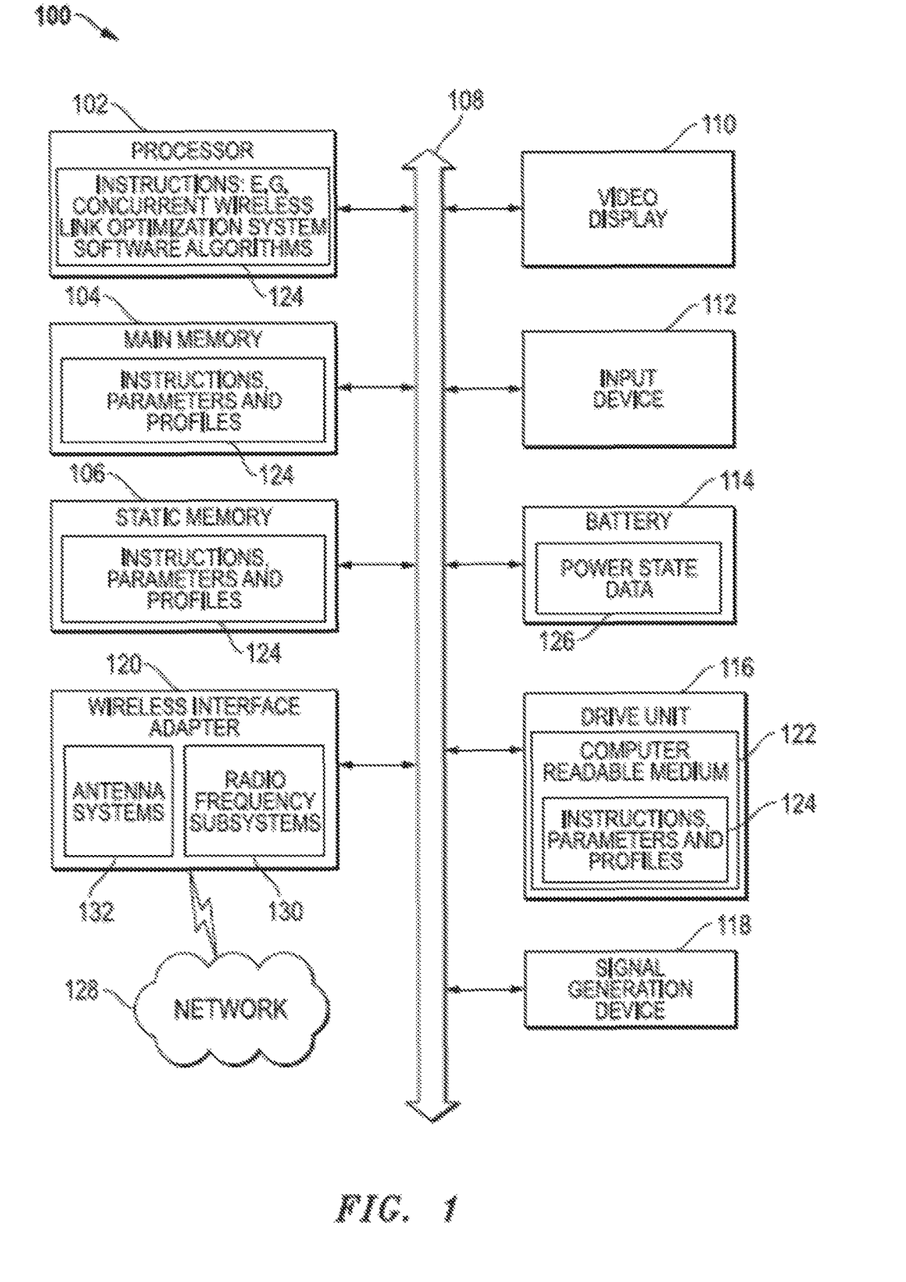
FIG. 1 is a block diagram illustrating an information handling system according to an embodiment of the present disclosure.

FIG. 1 shows an information handling system 100 capable of administering each of the specific embodiments of the present disclosure. The information handling system 100 can represent the wireless communication devices 210, 220, and 230 or servers or systems 290 located anywhere within network 200 of FIG. 2, including the remote data center 286 operating the virtual machine applications described herein. Information handling system 100 may represent a wireless communication device associated with a user or recipient of intended wireless communication. A wireless communication device may execute instructions via a processor for dynamically adjusting a frequency domain in response to specific absorption rate (SAR) according to embodiments disclosed herein. The system may operate in some example embodiments as a software agent, in whole or in part, on a wireless communication device while other portions may operate on remote server systems. Information handling system 100 may also represent a networked server or other system and administer aspects of the system via instructions executed on a processor according to various embodiments herein involving remote operation of such systems. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid-state display, or other type of display device. Display 110 may include a touch screen display module and touch screen controller (not shown) for receiving user inputs to the information handling system 100. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, or a mobile smartphone.

The information handling system 100 can include a set of instructions 124 that can be executed to cause the computer system to perform any one or more of the methods or computer based functions disclosed herein. For example, instructions 124 may execute a system, software agents, or other aspects or components for dynamically adjusting a frequency domain in response to specific absorption rate (SAR). For example, instructions 124 may execute a set of code instructions for a SAR level dynamic frequency adjustment system according to embodiments herein. In other aspects instructions 124 may execute algorithms to regulate transmission or reception along those wireless channels selected but which occupy nearby, both physically and in frequency of wireless link channel, to minimize potential effects of interference. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the system software algorithms may be stored here. Transmission frequency profiles may be stored in the disk drive unit and may include a pre-calibrated table of SAR power levels relative to the number of bandwidth subchannels active and relative to the additional wireless antenna systems 132 concurrently operating on an information handling system 100. The SAR power level and frequency subchannel pre-calibrated table may account for factors such as locations of transmitters with respect to one another and closeness (or identity) of operating frequencies during concurrent operation with a communication frequency band. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the system implementing dynamically adjusting a frequency domain in response to specific absorption rate (SAR) may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, wireless controller circuitry, amplifiers, and other circuitry for wireless communications. Each radiofrequency subsystem 130 may communicate with one or more wireless technology protocols. The radiofrequency subsystem 130 may contain individual subscriber identity module (SIM) profiles for each technology service provider and their available protocols. Alternatively, it may have a software based SIM profile that is reconfigurable. The wireless adapter 120 may also include antenna system 132 which may be tunable antenna systems for use with the system and methods disclosed herein.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G next gen operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation as described further below. In some embodiments, the shared, wireless communication band may be transmitted through one or a plurality of antennas. Other shared communication frequency bands are contemplated for use with the embodiments of the present disclosure as well.

In other aspects, the information handling system 100 operating as a wireless communication device may operate a plurality of wireless adapters 120 for concurrent radio operation in one or more wireless communication bands. The plurality of wireless adapters 120 may further share a wireless communication band in some disclosed embodiments. The proximity of concurrent radio transmission or reception in a shared band precipitates a desire to assess or model interference for concurrently operating wireless communication devices. Similarly, the proximity of concurrent radio transmission or reception in a shared band may further precipitate a remedy or adjustment to selected wireless link frequency channels or transmission or reception along those wireless channels.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment, the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may measure various metrics relating to wireless communication as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller may manage one or more radio frequency subsystems 130 within a wireless adapter 120. The wireless controller also manages transmission power levels which directly affect radio frequency subsystem power consumption. To detect and measure power consumption by a radio frequency subsystem 130, the radio frequency subsystem 130 may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated in an example embodiment.

The wireless network may have a wireless mesh architecture in accordance with mesh networks described by the wireless data communications standards or similar standards. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video, or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. Application programs 124 or firmware instructions operating on the wireless interface adapter 120 may execute all or parts of a SAR level dynamic frequency adjustment system according to embodiments of the present disclosure. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
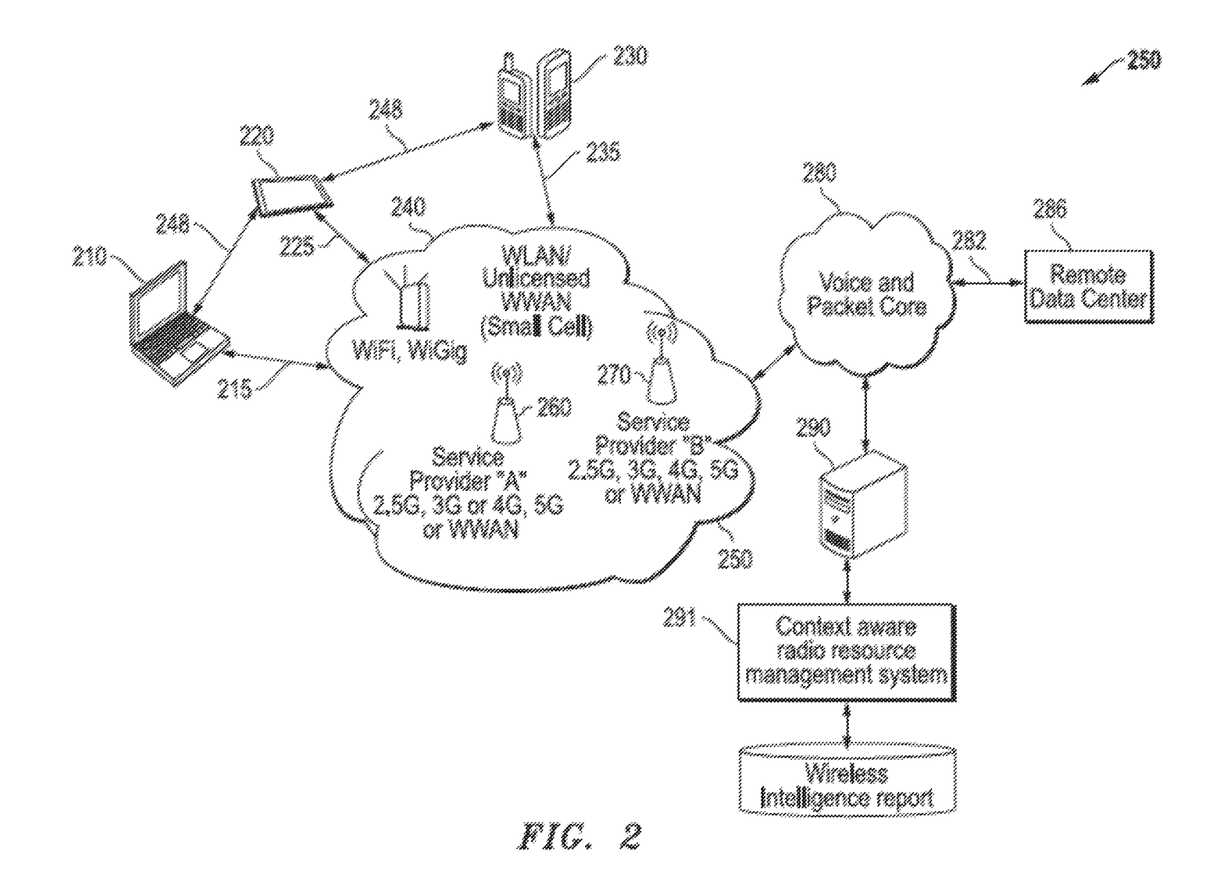
FIG. 2 is a block diagram of a network environment offering several communication protocol options and wireless communication devices according to an embodiment of the present disclosure.

FIG. 2 illustrates a network 200 that can include one or more information handling systems. In a particular embodiment, network 200 includes networked wireless communication devices 210, 220, and 230, wireless network access points, and multiple wireless connection link options. A variety of additional computing resources of network 200 may include client mobile information handling systems, data processing servers 290, network storage devices, local and wide area networks, or other resources as needed or desired. As specifically depicted, systems 210, 220, and 230 may be a laptop computer, tablet computer, or smartphone device. These wireless communication devices 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In one example embodiment, a standalone mobile information handling system 210, 220, or 230 may operate on WLAN such as Wi-Fi or on unlicensed WWAN small cell wireless links such as with small cell unlicensed LTE substations in wireless local network 240. Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments according to the present disclosure, a networked wireless communication device 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create issues with SAR levels when concurrent communication on both WLAN and WWAN access may operate within the same communication frequency bands.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional wireless communication devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In an example embodiment, the cloud or remote data center 286 or networked server 290 may run hosted applications for systems 210, 220, and 230. For example, remote data center 286, networked server 290, or some combination of both may operate some or all of a system as disclosed in the present disclosure. This may occur by establishing a virtual machine application executing software to manage applications hosted at the remote data center 286 in an example embodiment. Wireless communication devices 210, 220, and 230 are adapted to run one or more applications locally, and to have hosted applications run in association with the local applications at remote data center 286 or networked server 290. For example, wireless communication devices 210, 220, and 230 may operate some or all of the system software agent in some embodiments. The virtual machine application may serve one or more applications to each of wireless communication device 210, 220, and 230. Thus, as illustrated, systems 210, 220, and 230 may be running applications locally while requesting data objects related to those applications from the remote data center 286 via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at remote data center 286 that represents a Sharepoint data storage server.

In a further example, a web browser application may be operating at system 230. The web browser application may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, wireless communication devices 210, 220, and 230 may communicate intra-device via 248 when one or more of the wireless communication devices 210, 220, and 230 are set to act as an access point or even potentially a WWAN connection via small cell communication or licensed small cell WWAN connections. For example, one of wireless communication devices 210, 220, and 230 may serve as a Wi-Fi hotspot in an embodiment.

The connection quality of service (QOS) and speed of wireless links 215, 225, and 235 may vary widely depending on several factors including the service provider bandwidth, the number of wireless communication devices and users in a location, and other factors. Quality of service impacts energy consumption and efficiency of a wireless communication device communicating wirelessly. Thus, selection of a wireless link frequency subchannel to use or to shut down may depend on assessment of the link radio frequency conditions. Differences in wireless link QOS or efficiency will also vary minute-by-minute, hourly, daily, weekly or monthly or during even longer periods. Thus, assessment may need to be regular.

Wireless link conditions will vary depending on the type of service likely to be requested by the mobile information handling system. For example, voice communication may be most efficient on a 2G wireless protocol. Voice communication on 4G and emerging 5G may be more costly in terms of time required for authentication and connectivity negotiation or in terms of transmission power requirements. Data services relating to messaging and SMTP email may have the lowest power cost on 2.5G protocols due to the simplest access barriers there. Higher level data services requiring greater wireless bandwidth may more efficiently use recently implemented protocols. For example, audio streaming may be optimal for 3G protocols. Video streaming and HTTP web browsing may be best suited to 4G protocols or emerging 5G and much less efficient at lower protocols which are not designed to accommodate large data throughput.

As the protocols become more advanced, additional registration and initialization for data becomes costly from a processing and power consumption standpoint. This is balanced against the capabilities of the more advanced protocols to handle data transfers. More complicated communication protocols result in greater processing time and authentication/connection message exchange. More robust processor or controller operation and longer delays for transmitter or receiver circuits consume power. On the other hand, certain protocol advancements are designed to make data transfers quicker and more efficient. Thus, for example, the 4G or 5G protocol may generally consume more power during operation than 2.5G for voice communications, but less power for high volume data transfers.

For this reason, the wireless communication device operating context can play an important role in determining wireless link conditions and efficiency from a power consumption standpoint. Information about wireless link connection quality and capacity for a service to be used can be advantageous in optimizing communication channel selection. In most cases, transmission, or reception via a macro-cellular network 250 base station at a service provider 260 or 270 will take more power than communication via WLAN such as Wi-Fi. Among macro-cellular systems, energy consumption generally, but not in all circumstances, increases at each advancement of technology protocol from 2G to 5G. Plus, increased traffic levels on an advanced macro-cellular protocol may slow down in comparison to an older technology with less active traffic. Additional future macro-cellular protocols are contemplated as well. Those protocols may require additional energy demands of mobile information handling systems. Additionally, often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP, or other service types. It can also be specific to the wireless communication device used. Certain protocols may not be available on some mobile information handling systems. In each instance, radio frequency transmission subsystems and controllers operate and consume device power. Based on these numerous factors, the system of the present embodiment may automatically switch between radio frequency subchannels or radio network technologies to optimize radio frequency conditions, traffic conditions, device power consumption, cost, or any of the above. Selection of a wireless service provider and technology protocol may generally depend on the optimal wireless technology used for a service requested, the radio frequency conditions of a link, traffic conditions for the wireless link, and availability of a link.

Further, concurrent radiofrequency bands may be used having several channels for wireless link connections and which may include with potential overlapping use of shared radiofrequency bands including unlicensed bands and conditional shared communication frequency bands available under FCC Part 96 with use under Wi-Fi and emerging 5G technologies such as unlicensed small cell wireless links. Accordingly, wireless links 215, 225 and 235 may represent concurrent wireless links for two or more protocols operating within similar frequency bands. With the rise of multiple wireless protocols operating within shared communication frequency bands, wireless links may operate on separate channels within the communication frequency band, including within neighboring channels. In other aspects, the possibility further arises that wireless protocols within a communication frequency band may even attempt to operate on the same channel within a shared communication frequency band. Aspects of the present disclosure may determine potential conflicts within shared communication frequency bands as well as manage or mitigate interference that may arise within such situations.

For example, a wireless information handling system in communication with the network as described above, can adapt its transmission of signals to maintain specific absorption rate (SAR) within a desired range. Depending upon the geolocation of the information handling subsystem, the acceptable range of SAR may be regulated. In some embodiments, the wireless information handling system can adjust the set of frequencies at which the wireless information handling system communicates based on a measure or estimated SAR relative to the acceptable range. The wireless networks over which the wireless information handling subsystem communicates can be selected from IEEE 802.11 wireless protocols, LTE, LTE-LAA, or 5G, among others. In particular, the present device and method find particular use in wireless system that uses protocols implementing orthogonal frequency-domain multiple access, such as protocols IEEE 802.16, IEEE 802.20, MoCA 2.0, or IEEE 802.22, among others.

In some embodiments, the SAR level dynamic frequency adjustment system has applicability to wireless networks utilizing protocols adopting orthogonal frequency-division multiplexing (OFDM). A wireless network can permit communication using one or more channels subdivided into one or more subchannels. Devices accessing the wireless network can transmit over subchannels of the channel accessed by the device. Some protocols utilize a preset or pre-coded subchannels. For example, protocols 802.11n or 80.11ac utilize preset subchannels at 20 Hz, 40 Hz, and 80 Hz. In another example, protocols utilizing orthogonal frequency-division multiple access (OFDMA) dynamically assign subchannels or subcarriers within subchannels to devices accessing the network.

Figure 3A:
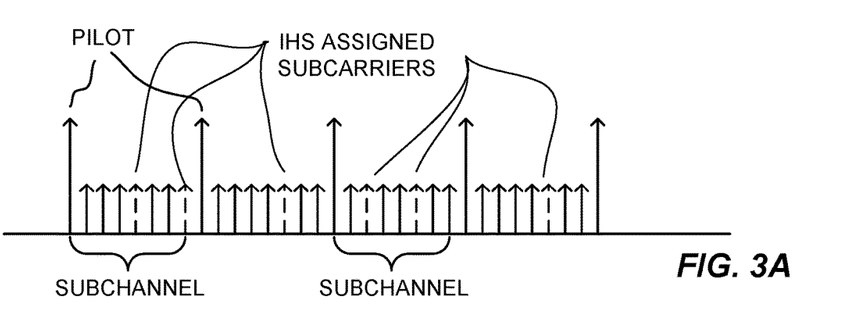
FIG. 3A and FIG. 3B include diagrams illustrating the selection of a frequency domain and a subset of the frequencies within the domain according to embodiments of the present disclosure.
Figure 3B:
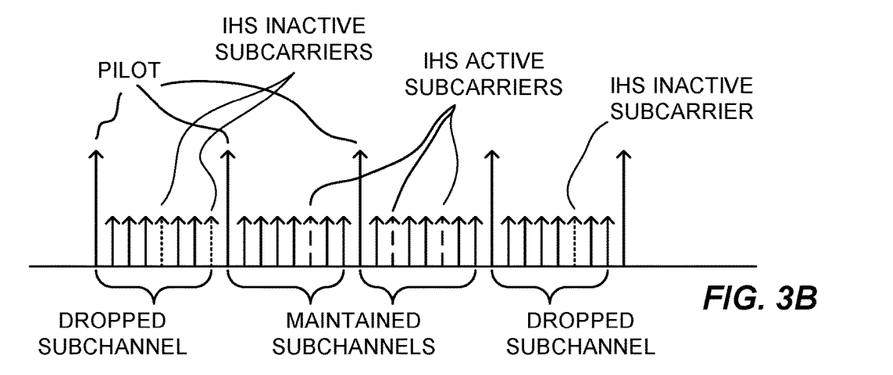

In an example illustrated in FIG. 3A and FIG. 3B, a wireless information handling system (IHS) can dynamically adjust which subset of frequencies are used to maintain SAR in a desired range. For example, as illustrated in FIG. 3A, a wireless information handling system can be assigned a frequency domain including a set of subcarriers (illustrated as subcarriers with broken lines) at which the IHS is to transmit. For example, when accessing a wireless network that uses OFDMA, the IHS is assigned a set of subcarriers within different subchannels. The IHS can transmit over the assigned subcarriers. Generally, the power and data rate used to transmit over the assigned subcarriers is lower than the power or data rate used under other protocols.

When the SAR is above a desired or regulated threshold, the IHS can dynamically select a subset of the set of frequencies and limit transmission via other frequencies of the set of frequencies. In particular, the IHS can selectively limit the use of subchannels that include subcarriers assigned to the IHS. In other words, the IHS can selectively stop using or drop one or more of the subchannels, designated as dropped subchannels in FIG. 3B, yielding inactive subcarriers that were assigned to the IHS, illustrated as dotted lines in FIG. 3B. The IHS can continue to transmit over the maintained subchannels and the associated subcarriers not dropped at the previous power and data rate, maintaining air time efficiency and low error rates, while reducing total transmission power and thus, the SAR.

When the SAR is low or below a desired threshold, frequencies can be added to the subset. For example, one or more of the dropped subchannels can be reactivated, reassigning subcarriers to the subset of the set of subcarriers used by the IHS. In this manner, the SAR can be adjusted by decreasing or increasing the number of subchannels of the set of subchannels assigned to the IHS that are used when transmitting, referred to herein as dynamically adjusting the frequency domain.

In contrast to varying transmission power used when transmitting across a single channel, dynamically adjusting the frequency domain maintains a desired transmission power for each subchannel used, while controlling the total power and thus, SAR by adjusting how many subchannels are used. Other protocols utilize time-division multiple access, which generally requires high data rates and high peak power when transmitting. In contrast, dynamically adjusting the frequency domain utilizes the lower peak power and lower transmission rates of OFDM systems, while still permitting adjustment for SAR levels.

Figure 4:
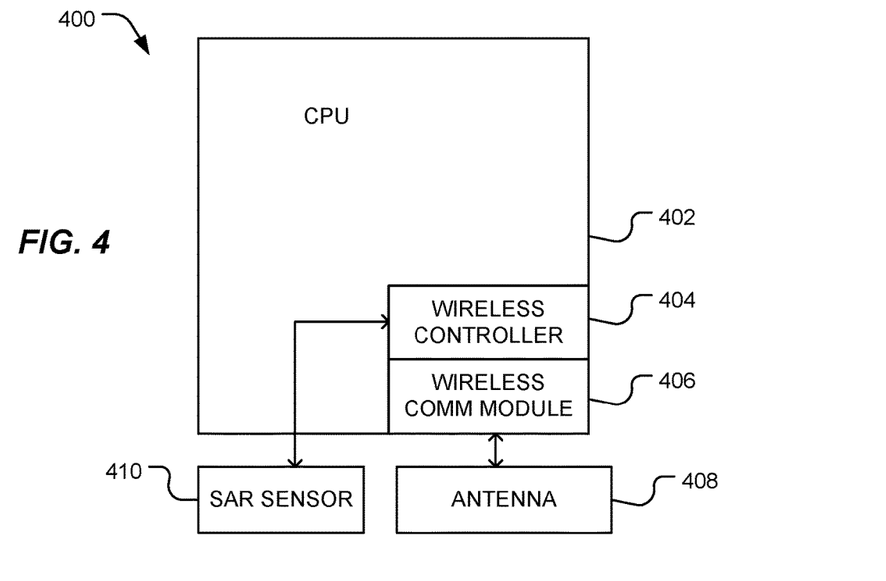
FIG. 4 includes an illustration of a circuitry useful in controlling and adjusting wireless device parameters in response to specific absorption rate according to embodiments of the present disclosure.

FIG. 4 illustrates a circuitry 400 for implementing wireless communication control that maintains SAR in a desired range. In some embodiments, the circuitry 400 includes a CPU 402 incorporating a wireless controller in communication with a wireless communication module 406. In an example, the wireless controller 404 can be an ARM-type or ARC-type controller. The wireless communication module 406 is in communication with antennas and other circuitry 408 for transmitting and receiving signals. Optionally, the circuitry 400 includes a specific absorption rate (SAR) sensor 410 in communication with the wireless controller 404. The SAR sensor 410 can detect SAR when transmitting using the set of frequencies and transmission parameters established by the wireless controller 404. Alternatively, the SAR can be estimated based on the transmission parameters and subset of transmission frequencies. For example, the SAR can be estimated using an algorithm, heuristic, or look-up table. In an example, a look-up table can be used in place of an SAR sensor 410. The SAR for a set of parameters including transmission power, number of subchannels, and which subchannels, can be measured or estimated in advance and the SAR values can be stored in a table. Table entries can be determined for each frequency domain. Alternatively, SAR contributions can be stored in the table for each subchannel, and the SAR can be estimated real-time based on the utilized subchannels. In an alternative example, a table can identify which subset of subchannels to use when assigned a frequency domain.

In use, the wireless controller 404 can establish a set of transmission parameters and frequencies at which the transmission occurs. The wireless communication module 406 in conjunction with the antenna and other transmission circuitry 408 can transmit in accordance with the transmission parameters at the set of frequencies. The SAR sensor 410 can measure or estimate SAR and provide feedback to the wireless controller 404 which can adjust the transmission parameters and transmission frequencies to maintain the SAR within the desired range. Alternatively, the wireless controller 404 can determine a subset of subchannels to be used once a set of transmission parameters and subchannels are assigned. For example, the wireless controller 404 can reference a look-up table based on the assigned subchannels to determine which subset to use when transmitting.

Figure 5:
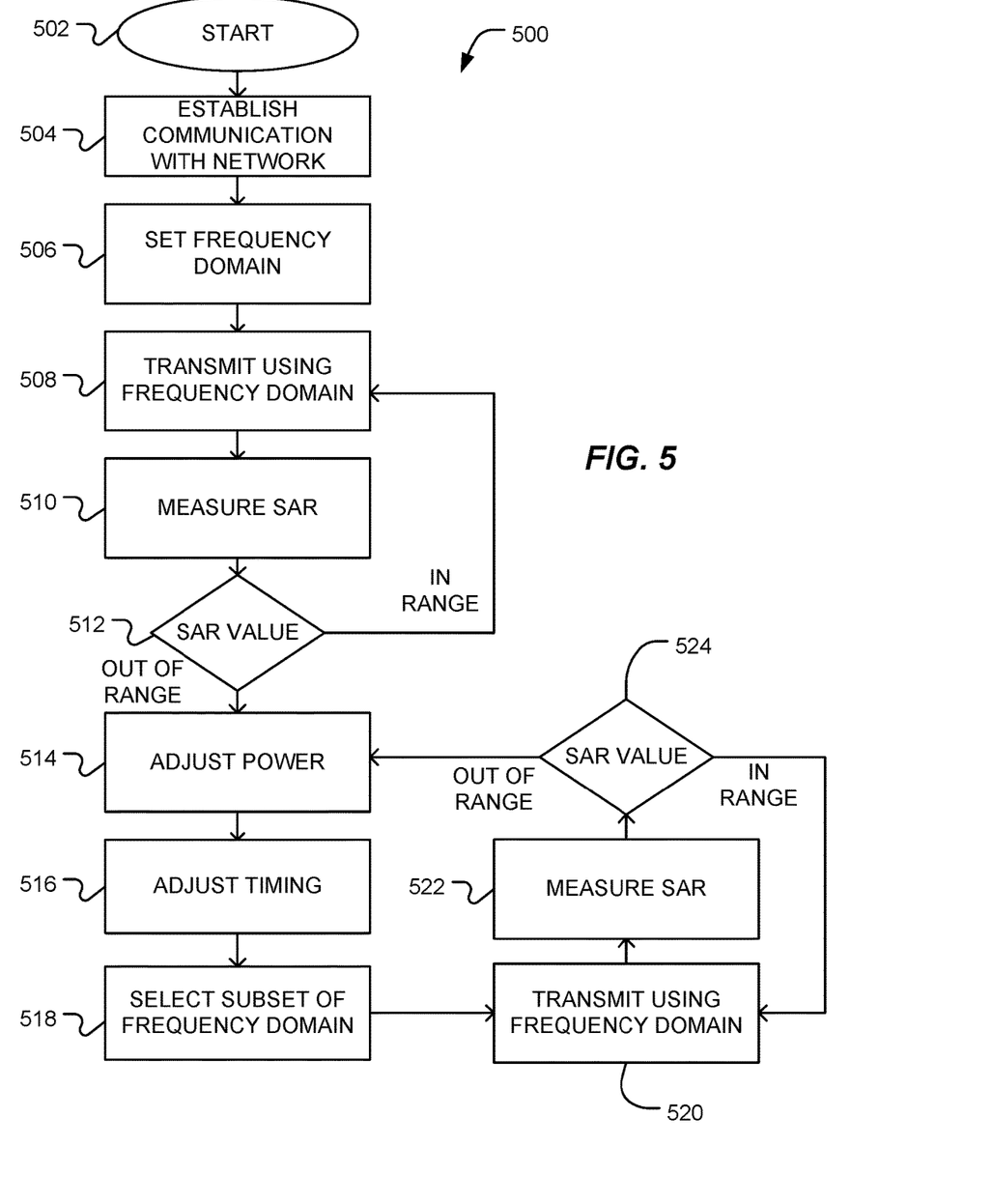
FIG. 5 includes a flow diagram illustrating a method for controlling transmission parameters based on specific absorption rate (SAR) according to embodiments of the present disclosure.

In some embodiments, FIG. 5 includes an illustration of a method 500 for controlling signal transmission to maintain SAR within a desired range. For example, the wireless information handling system can start, as illustrated at 502. The wireless information handling system can establish communication with the wireless network, as illustrated at block 504, for example, using the wireless controller and the wireless communications module. Exemplary wireless networks include those implementing protocols, such as IEEE 802.11, LTE, LTE-LAA, 5G, IEEE 802.16, IEEE 802.20, MoCA 2.0, or IEEE 802.22, among others.

Based on the protocols of the wireless communication network or based on a negotiation with the wireless communication system, a frequency domain can be set, as illustrated at block 506. For example, the frequency domain can include a set of subcarriers within subchannels allocated to the wireless information handling system. In another example, the frequency domain can include a set of frequencies defined by the communication protocol used by the wireless network. In particular, systems utilizing orthogonal frequency-division multiple access can allocate a set of frequencies to the wireless information handling system. The wireless information handling system can utilize the set of frequencies as the frequency domain.

In an embodiment, a wireless network can permit communication using one or more subchannels including one or more subcarriers, for example, operating using orthogonal frequency-division multiplexing. Devices accessing the wireless network can transmit over assigned subcarriers of the subchannels accessed by the device. Some protocols utilize a preset or pre-coded subset of subchannels. For example, protocols 802.11n or 80.11ac utilize preset subchannels at 20 Hz, 40 Hz, and 80 Hz. In another example, protocols utilizing orthogonal frequency-division multiple access (OFDMA) dynamically assign subchannels to devices accessing the network.

As illustrated at block 508, the wireless information handling system can transmit a signal using the frequency domain, for example, using the wireless communications module. In some embodiments, the wireless information handling system can transmit a signal utilizing the set of frequencies established by the wireless communication system. When transmitting using the frequency domain, the wireless information handling system can include a sensor that measures a specific absorption rate (SAR), as illustrated at block 510. Alternatively, the system can estimate the SAR based on transmission parameters, such as power and time-domain cycling, and the frequencies at which the transmissions occur. In a particular embodiment, the SAR level dynamic frequency adjustment system can determine SAR utilizing a look-up table. For example, the SAR level dynamic frequency adjustment system can look-up estimated values of SAR based on an assigned frequency domain. As illustrated at block 512, the system can determine whether the SAR value is in a desired range or outside of the desired range. For example, when the SAR values are within a desired range, the wireless communications module can continue to transmit using the established frequency domain, as illustrated block 506.

In another aspect, the SAR level dynamic frequency adjustment system according to embodiments may determine how many antenna systems are active. Upon determination of the number of active antenna systems, the maximum cumulative SAR transmission power levels may be determined. At this point, the SAR level dynamic frequency adjustment system may cross-reference a pre-calibrated table for SAR power reduction of operating wireless protocols with a plurality of OFDM subchannels, and determine whether to reduce power by halting operation of one or more subchannels while allowing active subchannels to operate at full bandwidth.

For example, when the SAR value is out of range, the wireless controller may seek to adjust parameters associated with the transmission and the set of frequencies over which the transmission is transmitted. Optionally, as illustrated at block 514, the wireless controller may seek to adjust the power of the transmission or, as illustrated at block 516, the wireless controller may seek to adjust the time-domain duty cycle of the transmission. Alternatively, the wireless information handling system may establish a set power for transmissions and may not utilize time-domain duty cycling.

In some embodiments, the wireless controller can select a subset of frequencies within the frequency domain, as illustrated at block 518. For example, when the SAR exceeds an upper threshold, the wireless controller can select a smaller subset of frequencies within the frequency domain to reduce the SAR. In an example, the wireless controller can selective drop subchannels including subcarriers assigned to the device. Optionally, the wireless controller may also reduce the power of the transmission or implement a time-domain duty cycle. Alternatively, when the SAR value is below a set threshold, the wireless controller can select a subset of frequencies within the frequency domain that includes more frequencies than the previously selected subsets of frequencies. Optionally, the wireless controller may also increase transmission power or select a different time-domain duty cycle.

Alternatively, the SAR level dynamic frequency adjustment system can use a look-up table to determine transmission parameters and the subset of subchannels to use based on the assigned frequency domain. For example, the look-up table can list subsets of subchannels based on the assigned frequency domain.

Following selection of the transmission parameters and the subset of frequencies within the frequency domain, the wireless communications module can transmit a subsequent signal using the selected subset of frequencies in the frequency domain and the transmission parameters, as illustrated at block 520. For example, the wireless communications module can transmit using maintained subchannels. While transmitting the subsequent signal, the sensor can measure the SAR, as illustrated at block 522. Alternatively, the system can estimate the SAR utilizing a look-up table. For example, the SAR level dynamic frequency adjustment system can look-up estimated values of SAR based on an assigned frequency domain.

As illustrated at block 524, when the SAR value is out range, the wireless controller can select a different subset of frequencies within the frequency domain and optionally, adjust transmission power or time-domain duty cycles. When the SAR is within the desired range, the wireless controller can continue to transmit subsequent signals using the selected subset of frequencies within the frequency domain and using the established transmission parameters.

Accordingly, the SAR can be maintained within a desired range by selecting subsets of frequencies in which to transmit. Such a method is airtime efficient and reduces transmit power by bandwidth control. In contrast to varying transmit power used when transmitting across a single channel, dynamically adjusting the frequency domain maintains a desired transmit power for each subchannel used, while controlling the total power and thus, SAR by adjusting how many subchannels are used. By maintaining the power across each utilized subchannel, the SAR level dynamic frequency adjustment system maintains lower error rates and fewer lost signals. Other protocols utilize time-division multiple access, which generally requires high data rates and high peak power when transmitting. In contrast, dynamically adjusting the frequency domain utilizes the lower peak power and lower transmission rates of OFDM systems, while still permitting adjustment for SAR levels.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for adjusting specific absorption rate associated with a wireless information handling system, the method comprising:

transmitting, using a wireless communication module of a wireless information handling system, a signal using a frequency domain including a set of frequencies;

measuring, using a sensor of the wireless information handling system, the specific absorption rate when transmitting the signal; and transmitting, using the wireless communication module of the wireless information handling system, a subsequent signal using an adjusted frequency domain including a subset of the set of frequencies less than the set of frequencies of the frequency domain adjusted in response to measuring the specific absorption rate to be out of a specified range.

2. The method of claim 1, further comprising determining, using a wireless controller, when the specific absorption rate exceeds a threshold to reduce one or more subset of frequencies available in the frequency domain of the signal.

3. The method of claim 2, further comprising selecting, using the wireless controller, the subset of the set of frequencies.

4. The method of claim 1, further comprising measuring, using the sensor, a second specific absorption rate when transmitting the subsequent signal.

5. The method of claim 4, further comprising selecting, using the wireless controller, a second subset of the set of frequencies based on the second specific absorption rate.

6. The method of claim 1, further comprising establishing communication with a remote communication system, the remote communication system providing the frequency domain to the wireless information handling system.

7. The method of claim 6, wherein the remote communication system utilizes an orthogonal frequency-divisional multiple access protocol.

8. A wireless information handling system comprising:
a specific absorption rate sensor;
a wireless communications module; and
a wireless controller in communication with the specific absorption rate sensor and the wireless communications module;
the wireless communications module to transmit a signal using a frequency domain including a set of frequencies;
the specific absorption rate sensor to measure the specific absorption rate when transmitting the signal; and
the wireless communication module to transmit a subsequent signal using an adjusted frequency domain including a subset of the set of frequencies less than the set of frequencies of the frequency domain adjusted in response to measuring the specific absorption rate to be out of a specified range.

9. The wireless information handling system of claim 8, wherein the wireless controller is to determine when the specific absorption rate exceeds a threshold.

10. The wireless information handling system of claim 9, wherein the wireless controller is to select the subset of the set of frequencies.

11. The wireless information handling system of claim 8, wherein the sensor is to measure a second specific absorption rate when transmitting the subsequent signal.

12. The wireless information handling system of claim 11, wherein the wireless controller is to determine a second subset of the set of frequencies based on the second specific absorption rate.

13. The wireless information handling system of claim 8, wherein the wireless controller and the wireless communication module are to establish communication with a remote communication system, the remote communication system to provide the frequency domain to the wireless information handling system.

14. The wireless information handling system of claim 13, wherein the remote communication system utilizes an orthogonal frequency-divisional multiple access protocol.

15. A wireless information handling system comprising:
a wireless communications module; and
a wireless controller in communication with the wireless communications module for executing code of a SAR level dynamic frequency adjustment system;
the wireless communications module to transmit a signal using a frequency domain including a set of frequencies;
the wireless communications module to estimate the specific absorption rate when transmitting the signal based on a pre-calibrated table of SAR power levels based on subchannels operating the set of frequencies in the signal using the frequency domain; and
the wireless communication module to transmit a subsequent signal using an adjusted frequency domain including a subset of the set of frequencies less than the set of frequencies of the frequency domain adjusted in response to estimating the specific absorption rate to be out of a specified range.

16. The wireless information handling system of claim 15, wherein the wireless controller is to determine when the estimated specific absorption rate exceeds a threshold.

17. The wireless information handling system of claim 16, wherein the wireless controller is to select the subset of the set of frequencies.

18. The wireless information handling system of claim 15, wherein the wireless controller and the wireless communication module are to establish communication with a remote communication system, the remote communication system to provide the frequency domain to the wireless information handling system.

19. The wireless information handling system of claim 18, wherein the remote communication system utilizes an orthogonal frequency-divisional multiple access protocol.

20. The wireless information handling system of claim 15, wherein the wireless controller and the wireless communication module are to establish communication with a remote communication system, the remote communication system utilizing a communication protocol specifying the frequency domain.

* * * * *